United States Patent
Argyropoulos et al.

(10) Patent No.: US 10,030,104 B2
(45) Date of Patent: Jul. 24, 2018

(54) AMBIENT TEMPERATURE CURABLE ISOCYANATE-FREE COMPOSITIONS FOR PREPARING CROSSLINKED POLYURETHANES

(71) Applicant: Dow Global Technologies LLC, Midland, MI (US)

(72) Inventors: John N. Argyropoulos, Midland, MI (US); Jeff R. Anderson, Tomball, TX (US); Nahrain E. Kamber, Midland, MI (US); Rebecca S. Ortiz, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 144 days.

(21) Appl. No.: 15/068,823

(22) Filed: Mar. 14, 2016

(65) Prior Publication Data

US 2016/0289386 A1 Oct. 6, 2016

Related U.S. Application Data

(60) Provisional application No. 62/140,500, filed on Mar. 31, 2015.

(51) Int. Cl.
| | | |
|---|---|---|
| *C08G 67/02* | (2006.01) | |
| *C08G 71/04* | (2006.01) | |
| *C09D 175/12* | (2006.01) | |
| *C09D 175/04* | (2006.01) | |
| *C08G 12/46* | (2006.01) | |

(52) U.S. Cl.
CPC ............. *C08G 71/04* (2013.01); *C08G 12/46* (2013.01); *C09D 175/04* (2013.01); *C09D 175/12* (2013.01)

(58) Field of Classification Search
CPC .............................. C08G 71/04; C09D 175/12

USPC ......................................................... 524/612
See application file for complete search history.

(56) References Cited

U.S. PATENT DOCUMENTS

| | | | |
|---|---|---|---|
| 3,200,099 A | 8/1965 | Lewis et al. | |
| 5,155,170 A | 10/1992 | Baukema et al. | |
| 6,252,121 B1 | 6/2001 | Argyropoulos et al. | |
| 8,653,174 B2 | 2/2014 | Anderson et al. | |
| 2011/0159281 A1* | 6/2011 | Marx ..................... | B82Y 30/00 428/343 |
| 2011/0313091 A1* | 12/2011 | Argyropoulos .... | C08G 18/3831 524/391 |
| 2013/0165581 A1* | 6/2013 | Argyropoulos ......... | C08F 22/10 524/560 |
| 2013/0172472 A1* | 7/2013 | Greyson .............. | C09D 175/04 524/512 |
| 2014/0369850 A1 | 12/2014 | Popa et al. | |
| 2015/0166828 A1* | 6/2015 | Anderson ............ | C09D 175/04 428/425.1 |
| 2015/0344417 A1* | 12/2015 | Anderson ............. | C07C 269/04 560/158 |
| 2016/0130472 A1* | 5/2016 | Popa ..................... | C08G 12/46 428/339 |

FOREIGN PATENT DOCUMENTS

| | | |
|---|---|---|
| EP | 255608 A2 | 2/1988 |
| EP | 2749596 A1 | 7/2014 |
| WO | 9839393 A1 | 9/1998 |

\* cited by examiner

*Primary Examiner* — Jane L Stanley
(74) *Attorney, Agent, or Firm* — Karl E. Stauss; Cantor Colburn LLP

(57) ABSTRACT

The present invention provides a multicomponent composition that is substantially isocyanate-free and comprises a polycarbamate as a first component having a filler, pigment, extender or matting agent and a second component containing an acidic catalyst an alkanol having one OH group, a polyaldehyde and an acetal or hemiacetal of the polyaldehyde. The compositions are shelf stable and useful as two components and avoid problems caused by combining the catalyst with any filler, pigment, extender or matting agent.

13 Claims, No Drawings

AMBIENT TEMPERATURE CURABLE ISOCYANATE-FREE COMPOSITIONS FOR PREPARING CROSSLINKED POLYURETHANES

The present invention generally relates to substantially isocyanate free multicomponent compositions useful as just two components comprising a polycarbamate component and a component comprising one or more alkanol having one OH group, a polyaldehyde and an acetal or hemiacetal of a polyaldehyde and a catalyst, as well as related compositions, processes, articles, and other related inventions.

Polyurethanes comprise repeat units that contain carbamate groups of formula (A): —O—C(=O)—N< (A). The preparation of the polyurethane can be broadly characterized by types of structures of complimentary reactants which are isocyanate containing and active hydrogen containing.

Because the isocyanate containing polyurethane chemistry presents environmental and health concerns associated with preparation and use of polyisocyanate compounds, one need has been discovery of a viable isocyanate-free polyurethane preparation, especially a room temperature curable one.

Isocyanate free polyurethane compositions have sought to address the health and safety concerns stemming from isocyanates and their residuals. Known isocyanate-free compositions must be cured at elevated temperatures (typically above 80° C.) to achieve effective curing and give a crosslinked polyurethane. The high cure temperature deficiency of prior art isocyanate-free polyurethane preparations prevents them from being used in floor, furniture, automotive, industrial maintenance and adhesive applications requiring curing at ambient temperatures, for example, room temperature (e.g., 20° C. to 30° C.). Further, known isocyanate-free polyurethane compositions are generally formulated as multiple component compositions containing a catalyst and pigments, fillers or extenders in a common component. In such a case, the catalyst will adsorb on the surface of the pigments, fillers or extenders and subsequently reduces the cure response when the multiple components are combined. This leads to poor cure response due to the catalyst adsorbing onto the pigments. Over time, the catalyst will be bound to the pigment and be unavailable for activating crosslinking. In such isocyanate free ambient cured systems, the catalyst is kept separate for storing the compositions; and the compositions need to be formulated with each of a carbamate component, a catalyst component and a component that is reactive with the carbamate.

Known isocyanate free compositions comprise a polycarbamate component and polyaldehyde second component. When mixing a polycarbamate component and polyaldehyde second component, there is a minimum 15 minute induction time needed to allow alcohol in the mixture to react with the aldehyde to form acetal. One must wait the induction time before using the mixture or they will have initial hardness values that will be higher than the hardness performance of the system after induction.

U.S. Pat. No. 8,653,174 B2, to Anderson et al., discloses multicomponent compositions that are substantially isocyanate-free and comprise a polycarbamate as one component, and a polyaldehyde or an acetal or hemiacetal thereof as a second component such that the two components cure at a temperature of from 0° C. to less than 80° C. to form a crosslinked polyurethane. Anderson discloses transcarbamylation of polyols to make polycarbamates. Anderson discloses a polycarbamate first component (Part A) that may further comprise one or more of any of a solvent, flow additive, dispersant, pigments/fillers, a separate catalyst component, and a polyaldehyde component. Having the catalyst in the formulated Part A with the pigments, Anderson fails to disclose a way to avoid having a catalyst adsorb on the surface of the pigments, fillers or extenders or a way to make a storage stable two component system. Furthermore the pigments, fillers or extenders can be basic (pH>7) in nature and neutralize the acid catalyst during storage of the Part A components. To avoid pigment adsorption and or neutralization problems with the catalyst, three components, including a separate catalyst component, are mixed in at the time of use.

The present invention seeks to solve the problem of providing a storage stable, and more easily formulated two component substantially isocyanate free composition comprising any of pigments, fillers or extenders for making polyurethanes.

STATEMENT OF THE INVENTION

1. In accordance with the present invention, substantially isocyanate-free multicomponent, preferably, two component compositions having a pH of 7.0 or less comprise as a first component one or more polycarbamate having two or more carbamate groups and one or more matting agent, filler, extender or pigment in the amount of from 1 to 80 wt. %, or, preferably, from 5 to 70 wt. %, or, preferably, from 10 to 60 wt. %, based on the total solids of the first component, and, as a second component, one or more alkanol having one OH group, preferably, a primary alcohol, one or more polyaldehyde, that has two or more aldehyde groups, such as a dialdehyde, preferably, a cyclic dialdehyde, or, preferably, a cycloaliphatic dialdehyde, and one or more acetal or hemiacetal of the polyaldehyde, from 0.01 to 10 wt. % or, preferably, from 0.1 to 5 wt. %, or, more preferably from 0.5 to 3 wt. % of one or more catalyst, such as an organic or inorganic protic acid or Lewis acid thereof having a pKa of less than 5.0, such as a sulfonic acid, based on the total weight of solids in the composition, such that the first and second components when combined form a composition that reacts to cure at a temperature of from 0° C. to less than 80° C. to form a crosslinked polyurethane.

2. In accordance with the multicomponent compositions of item 1, above, preferably, in the first component of the composition of the present invention, the polycarbamate is, for example, the condensation product of one or more polyols with an unsubstituted carbamic acid alkyl ester or urea. Suitable polyols may include, for example, an acrylic polyol, saturated polyester polyol, alkyd polyol, polyether polyol or polycarbonate polyol.

3. In accordance with the multicomponent compositions of any of items 1 or 2, above, the first component may further comprise one or more of any of a solvent, flow additive, defoamer, deaerator, surfactant, uv absorber, flexibilizer, rheology modifier, wax, or dispersant.

4. In accordance with the multicomponent compositions of any of items 1, 2 or 3, above, preferably, the polyaldehyde in the second component is chosen from (cis,trans)-1,4-cyclohexane dicarboxaldehydes, (cis,trans)-1,3-cyclohexane dicarboxaldehydes and mixtures thereof.

5. In accordance with the multicomponent compositions of any of items 1, 2, 3, or 4, above, the one or more pigments, fillers or extenders may be chosen from any metal oxides, such as titanium dioxide, iron oxides, natural silica, synthetic silica, such as silica gels, alkali metal silicates, such as talc, barium sulfate, and clays and glass spheres.

6. In accordance with the multicomponent compositions of any of items 1, 2, 3, 4, or 5, above, the blend ratio of the first component to the second component from is 2:1 to 5:1, based on solids weight. The ratio is higher when the composition of the first component comprises more of any pigments, fillers or extenders.

7. In accordance with the multicomponent compositions of any of items 1, 2, 3, 4, 5, or 6, above, the second component of the present invention is shelf stable to gelation and phase separation after a 4 week heat age test at 60° C. was completed.

8. In accordance with the multicomponent compositions of any of items 1, 2, 3, 4, 5, 6, or 7, above, preferably, to increase the pot-life of the composition, the multicomponent composition of the present invention further comprises water as a curing inhibitor.

9. In another aspect, the present invention provides methods of making substantially isocyanate-free multicomponent composition, such as a two component composition, having a pH of 7.0 or less comprise which comprise providing as a first component one or more polycarbamate having two or more carbamate groups and one or more filler, extender or pigment in the amount of from 1 to 80 wt. %, or, preferably, from 5 to 70 wt. %, or, preferably, from 10 to 60 wt. % or less, based on the total solids of the first component, separately, forming a second component by mixing from 5 wt. % to 90 wt. %, or, preferably, from 10 to 90 wt. %, and, more preferably, from 20 to 80 wt. %, based on the total weight of the second component, of one or more alkanol having one OH group, preferably a primary alcohol, and a polyaldehyde that has two or more aldehyde groups, such as a dialdehyde, preferably, a cyclic dialdehyde, or, more preferably, a cycloaliphatic dialdehyde to form an acetal or hemiacetal of the polyaldehyde as a mixture in the alkanol and adding into the thus formed mixture from 0.01 to 10 wt. % or, preferably, from 0.1 to 5 wt. %, or, more preferably from 0.5 to 3 wt. %, based on the total weight of solids in the composition, of one or more catalyst, such as an organic or inorganic protic acid or Lewis Acid having a pKa of less than 5.0, such as a sulfonic acid. The first and second components when combined form a composition that reacts to cure at a temperature of from 0° C. to less than 80° C. to form a crosslinked polyurethane.

10. In accordance with the methods as set forth in 9, above, forming the second component comprises adding the alkanol to the CHDA with good mixing for from 5 to 40 minutes, preferably, from 15 to 25 minutes, followed by addition of the acid catalyst to the second component.

11. In accordance with another aspect of the present invention, processes for preparing a crosslinked polyurethane from the multicomponent compositions of any of items 1, 2, 3, 4, 5, 6, 7 or 8, above, comprise mixing the polycarbamate containing first component and the second component, and curing the resulting composition at a temperature of from 0° C. to less than 80° C., for example, at room temperature, wherein the ambient temperature curable composition has an effective amount of a catalyst.

As used herein, the term "ambient temperature" means a temperature of from 0° C. to less than 80° C.

As used herein,

(or an end "—" taken in context) indicates a radical.

As used herein, the term "polyaldehyde" means a molecule containing two or more aldehyde groups or their hydrates. The aldehyde group can be written herein as —C(=O)H or —CHO. The term "polyaldehyde" is not used herein to mean a polymeric substance made by self-polymerizing an aldehyde monomer.

As used herein, the term "substantially free of isocyanate groups" or "substantially isocyanate-free" isocyanate groups means having less than 5 mole percent (mol %) of —N=C=O groups (i.e., isocyanate groups) based on total moles of carbamate groups plus isocyanate groups in the composition, preferably, less than 3 mol %, or, more preferably, less than 1 mol %, and, still more preferably, less than 0.1 mol %.

Unless otherwise noted herein, the term "carbamate group" means a radical structure of formula

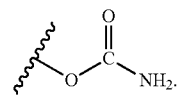

As used herein, the term "multicomponent composition" means a composition comprising two or more components, each one having at least one ingredient.

As used herein, the term "polycarbamate" means a molecule containing two or more carbamate groups (H2NC(O)O—), wherein the molecule is capable of reacting with the hemiacetal or acetal of a polyaldehyde during the invention curing step so as to form a crosslinked polyurethane.

As used herein, the term "average number of carbamate groups" means the total number average molecular weight of a given polycarbamate as determined by gel permeation chromatography against a polystyrene standard divided by the carbamate equivalent weight of the polycarbamate.

As used herein, the term "carbamate equivalent weight" (CEW) on solids is calculated using the following equation:

$$CEW = (OHEW_{polyol} + (43 \times \text{Carbamate Conversion})) \div \text{Carbamate Conversion},$$

wherein the term "Carbamate Conversion" is a ratio determined using the following equation:

$$\text{Carbamate Conversion} = (\text{OH \#}_{polyol} - \text{OH \#}_{polycarbamate}) \div \text{OH \#}_{polyol}$$

Note that a Carbamate Conversion can be expressed as a percentage when multiplied by 100%.

As used herein, the term "substantially formaldehyde free" is less than 500 ppm based on the weight of polyaldehyde solids.

As used herein, the term "polyol" means an organic molecule having at least 2-OH functionalities.

As used herein, the term "polyester polyol" means a subclass of polyol that is an organic molecule having at least 2 alcohol (—OH) groups (preferably including alpha,omega —OH) and at least one carboxylic ester ($CO_2$—C) functionality. The term "alkyd" means a subclass of polyester polyol that is a fatty acid-modified polyester polyol wherein at least one carboxylic ester functionality is preferably derived from an esterification reaction between an alcoholic —OH of the polyol and a carboxyl of a ($C_8$-$C_{60}$)fatty acid.

As used herein, the phrase "react together" means creating one or more covalent bonds between two or more molecules, or portions thereof.

As used herein, the term "total solids" or "solids" refers to resins, reactants and all non-volatile additives or ingredients, including catalysts; solids does not include water or solvents. A volatile additive or ingredient is any that volatilizes in use or cure, such as water or ethanol.

The acronym "ANSI" stands for American National Standards Institute, the name of an organization headquartered in Washington, D.C., USA. The acronym "ASTM" stands for ASTM International, the name of an organization headquartered in West Conshohocken, Pa., USA; ASTM International was previously known as the American Society for Testing and Materials. The acronym "ISO" stands for International Organization for Standardization, the name of an organization headquartered in Geneva 20, Switzerland.

Unless otherwise stated, all units of pressure and temperature refer to standard pressure and room temperature.

Unless otherwise stated, all ranges are inclusive and combinable. For example a stated range of from 0.5 wt. % to 90 wt. %, or, preferably, at most 60 wt. %, and, more preferably, at most 50 wt. %, with preferable minimum amounts of at least 1 wt. %, or, more preferably, at least 2 wt. % will read on ranges of from 0.5 wt. % to 90 wt. %, from 0.5 to 60 wt. %, or, from 0.5 to 50 wt. %, or, from 1 to 90 wt. %, or, preferably, from 1 to 60 wt. %, or, preferably, from 2 to 60 wt. %, or, preferably, from 1 to 50 wt. %, or, more preferably, from 2 to 50 wt. %.

The present invention provides a substantially isocyanate-free multicomponent composition, processes for making the multicomponent composition and for using the composition to prepare crosslinked polyurethanes, as well as kits for preparing crosslinked polyurethanes. The present invention enables two component versions of such compositions that are storage stable. Having the catalyst in the second component without any pigments, fillers or extenders helps to keep the composition cure response stable and consistent; as the catalyst is kept from adsorbing on the pigment surface or being neutralized by the pigment, filler or extender, the present invention eliminates any reduction of the cure response. In addition, formulating the second component with a catalyst eliminates the need for an induction time; and the formation of acetal is completed during the initial blending and storage of the second component. This helps to mitigate variations in coating properties as the formulation ages and is applied at different times during its useful pot-life, when the acid component is added last to the formulation. Further, the compositions of the present invention enable dilution of the second component having an acetal or hemiacetal of a polyaldehyde, an alkanol and the catalyst so that one can mix the two components at a ratio of the first component to the second component of from 2:1 to 5:1, based on weight solids. This leads to easier mixing and less chance for improper blend ratios and reduced resin loss or waste. Still further, the second component of the present invention was shelf stable after a 4 week heat age test at 60° C. was completed. Meanwhile, coating performance properties, mainly dry time, hardness and MEK resistance did not test outside of critical test requirements.

The crosslinked polyurethanes of the present invention, even those produced by curing at room temperature, have a high degree of crosslinking. The crosslinked polyurethane of the present invention exhibits one or more improved properties such as, for example, improved water resistance, improved deterioration resistance to methyl ethyl ketone (MEK) rubs, increased hardness, improved cross-hatch adhesion, or a combination thereof. The only byproduct produced by curing to make a crosslinked polyurethane is water. Accordingly, the present invention can be employed in isocyanate-free, formaldehyde free, low temperature curing commercial applications that heretofore were unattainable by prior art approaches, which produced unsuitably low levels of crosslinking, unacceptable levels of volatile organic compound (VOC) byproducts, or both, and/or required unsuitably high curing temperatures.

The first component and second component, and any other component of the multicomponent composition of the present invention may be mixed to prepare an ambient temperature curable composition substantially free of isocyanate groups.

Preferred crosslinked polyurethanes have at least one geminal bis(urethane) group.

The crosslinked polyurethane of the present invention may be useful as an adhesive, coating, or sealant.

Preferably, the multicomponent composition is "substantially isocyanate-free".

To enable formation of the acetal or hemiacetal of the second component of the present invention, the alkanol must be present in the second component in an amount such that the number of moles of hydroxyl groups or moles of monoalkanols is well in excess of the number of moles of aldehyde groups in the polyaldehyde. The alkanol also serves as a continuous fluid. One mole of a dialdehyde contains two moles of aldehyde groups.

The acetal or hemiacetal of a polyaldehyde of the present invention can be formed from any polyaldehyde having, for example, from 2 to 100, or, preferably, from 2 to 20 carbon atoms, with the proviso that polyaldehydes having more than 20 carbon atoms will have at least one aldehyde group for every 11 carbon atoms. The polyaldehyde can be acyclic, straight or branched; cyclic and nonaromatic; cyclic and aromatic (e.g., 3-formylbenzaldehyde), or a combination thereof.

The acetal or hemiacetal of a polyaldehyde of the second component of the present invention can be prepared, respectively, by reacting the polyaldehyde with water; one mole equivalent of an alkanol (e.g., methanol or ethanol); or two mole equivalents of the alkanol).

The alkanol is present in the second component at a concentration of from 5 wt. % to 90 wt. %, based on the total weight of the second component, or preferably, from 10 to 90 wt. %, and, more preferably, from 20 to 80 wt. %.

The acetal or hemiacetal of a polyaldehyde of the present invention is substantially formaldehyde free. As used herein, the term "substantially formaldehyde free" is less than 500 ppm based on the weight of polyaldehyde used to make the acetal or hemiacetal of the polyaldehyde.

According to the present invention, the polyaldehyde used to form the acetal or hemiacetal of a polyaldehyde of the second component may comprise one or more acyclic, straight or branched polyaldehydes having from 2 to 16 carbon atoms.

Preferably, the acetal or hemiacetal of a polyaldehyde of the present invention is formed from one or more cyclic, nonaromatic polyaldehydes. For example, the polyaldehyde comprises one or more cyclic, nonaromatic polyaldehydes having from 3 to 20 ring carbon atoms, and may consist essentially of one or more cyclic, nonaromatic polyaldehydes having from 12 to 60 ring carbon atoms.

More preferably, any cyclic, nonaromatic polyaldehyde used to form the acetal or hemiacetal of a polyaldehyde in the multicomponent composition independently has from 5 to 12 ring carbon atoms, and even more preferably a mixture of (cis,trans)-1,4-cyclohexanedicarboxaldehydes and (cis,trans)-1,3-cyclohexanedicarboxaldehydes.

The polyaldehydes used in the present invention can be prepared by any suitable means, including oxidation of corresponding polyols, and via batchwise and continuous processes for preparing the polyaldehydes. Preferably, the polyaldehyde is prepared by hydroformylating a substantially water-insoluble mono-olefin containing aldehyde compound, substantially water-insoluble multi-olefin containing aldehyde compound, oligomer or polymer, or a substantially water-insoluble multi-olefin containing starting compound. The hydroformylation step can be performed by any conventional means such as with hydrogen gas, carbon monoxide, and the olefin-containing starting compound. For example, acyclic, straight or branched polyaldehydes having 16 carbon atoms or more are prepared by hydroformylating a substantially water insoluble multi-olefin-containing compound, oligomer or polymer that is derived from a fatty acid ester or a seed oil. Preferably, hydroformylation is performed in a manner as generally described in U.S. Pat. No. 6,252,121 B1, which describes an improved separation process. Preferably, hydroformylation is carried out in a continuous manner.

Polyaldehyde products can comprise multiple polyaldehydes as mixtures, which products can be separated from the other components of crude reaction mixtures in which the polyaldehyde mixtures are produced by phase separation. Phase separation can occur spontaneously or can be induced by a change in temperature or pressure or the addition of an additive, e.g., salt, solvent or combinations thereof. For example, at the conclusion of (or during) hydroformylation, the desired polyaldehyde can be recovered from the reaction mixtures.

Preferably, the polyaldehydes of the present invention are mixtures comprising two or more of trans-1,3-cyclohexanedicarboxaldehyde, cis-1,3-cyclohexanedicarboxaldehyde, trans-1,4-cyclohexanedicarboxaldehyde and cis-1,4-cyclohexanedicarboxaldehyde, or protected or blocked derivatives of these polyaldehydes.

The polycarbamate of the first component of the present invention may have two carbamate groups (also referred to herein as a dicarbamate), or three carbamate groups (also referred to herein as a tricarbamate), or four or more carbamate groups.

The polycarbamate can be acyclic, straight or branched; cyclic and nonaromatic; cyclic and aromatic, or a combination thereof. In some embodiments the polycarbamate comprises one or more acyclic, straight or branched polycarbamates. For example, the polycarbamate may consist essentially of one or more acyclic, straight or branched polycarbamates.

Preferably the polycarbamate consists of carbon, hydrogen, nitrogen, and oxygen atoms. More preferably, the polycarbamate consists of carbon, hydrogen, nitrogen, and oxygen atoms, wherein each nitrogen and oxygen atom is the nitrogen or oxygen atom of one of the two or more carbamate groups of the polycarbamate.

Suitable polycarbamates may be prepared by (a) reacting a polyol with methyl carbamate or urea to give the polycarbamate; (b) reacting a polyisocyanate with a hydroxy($C_2$-$C_{20}$)alkyl-carbamate to give the polycarbamate; or (c) reacting the hydroxy($C_2$-$C_{20}$)alkyl-carbamate with methacrylic anhydride to give a 2-carbamoylalkyl methacrylate, and then polymerizing the 2-carbamoylalkyl methacrylate with an acrylic acid monomer to give the polycarbamate as a polyacrylic-based polycarbamate. The polycarbamates produced in (a) to (c) typically will have different structures. Examples of these reactions are illustrated graphically below in respective Schemes (a) to (c):

Scheme (a):

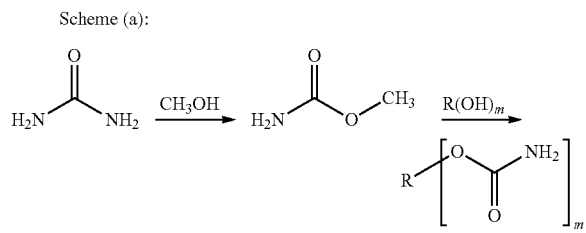

wherein m is as defined for Scheme (a) and $R(OH)_m$, where m is 2 or greater.

Scheme (b):

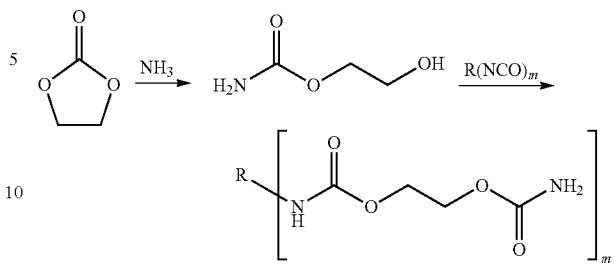

wherein m is an integer of from 2 or greater. Preferably m is an integer of from 2 to 20. In some embodiments m is 2 or 3.

Scheme (c):

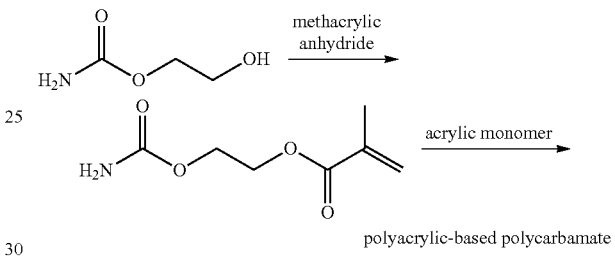

polyacrylic-based polycarbamate wherein methacrylic anhydride is $[CH_2\!\!=\!\!C(CH_3)C(\!\!=\!\!O)]_2O$ and examples of acrylic monomers are acrylic acid, ($C_1$-$C_{20}$)alkylacrylic acid (e.g., the ($C_1$)alkylacrylic acid is methacrylic acid), and ($C_1$-$C_{20}$)alkyl acrylate (i.e., acrylic acid ($C_1$-$C_{20}$)alkyl ester, e.g., ($C_1$)alkyl acrylate means methyl acrylate). Not shown in Scheme (c), other olefinic monomers (e.g., styrene) can also be employed along with the acrylic monomer, thereby preparing the polycarbamate as a poly(acrylic other olefinic monomer)-based polycarbamate.

Preferably, each of the one or more acyclic, straight or branched polycarbamates is prepared by reacting one or more polyols with an unsubstituted carbamic acid alkyl ester or urea to yield one or more acyclic, straight or branched polycarbamates. Suitable polyols may be (meth)acrylic polyols (i.e., a methacrylic or acrylic polyol), alkyd polyols, polyalkylene polyols, polyether polyols (e.g., a poly(oxyalkylene) such as a poly(oxyethylene), such as a poly(ethylene glycol), polyester polyols, or polycarbonate polyols. Preferably, the polyol is an acrylic or alkyd polyol.

Polycarbamates useful for wood coatings may be made by feeding one or more a) alkyl carbamates, such as methyl carbamate, or urea (in water) in fluid form into a reaction medium containing one or more b) alkyd polyols, preferably, short or medium oil alkyd polyols, to form a reaction mixture and then carbamylating the alkyd polyol by heating the reaction mixture in the presence of one or more c) carbamylation catalysts, such as dibutyl tin oxide.

As used herein, an "alkyd polyol" is the reaction product of one or more monocarboxylic acid oils, one or more polycarboxylic acids having two or more carboxylic acid, salt or halide groups, or the anhydride thereof, and one or more polyalcohols having three or more, preferably from three to five, hydroxyl groups, such as erythritol, pentaerythritol, trimethylolpropane, or trimethylolethane.

Suitable acids for forming alkyd polyols may include monocarboxylic acids or oils chosen from oleic acid, lauric acid, coconut oil, sunflower oil, and mixtures thereof.

The polycarbamate may comprise one or more cyclic, nonaromatic polycarbamates and may consist essentially of one or more cyclic, nonaromatic polycarbamates.

Preferably, the polycarbamate of the present invention is substantially isocyanate free. The presence or absence of molecules containing isocyanate groups can be readily determined by Fourier Transform Infrared (FT-IR) spectroscopy or carbon-13 nuclear magnetic resonance ($^{13}$C-NMR) spectroscopy. Where an isocyanate group-containing reactant is employed, the polycarbamate prepared therefrom is titrated or "quenched" by an isocyanate quenching agent to convert any residual isocyanate groups to carbamates or amines. Examples of compounds that could be used as an isocyanate quenching agent are water, sodium hydroxide, methanol, sodium methoxide, and a polyol.

The first component of the present invention comprises any filler, extender or pigment in the multicomponent compositions. Preferably, in the first component of the present invention, the composition comprises one or more pigment (e.g., $TiO_2$, lamp black, talc), or extender, such as silica, or clay. Suitable extenders may be used as matting agents.

A curing inhibitor, preferably, a primary alcohol or water or both may be present in the multicomponent compositions in an amount of from 5 wt. % to 90 wt. % based on the total weight of the composition, or, more preferably, at most 60 wt. %, and, still more preferably, at most 50 wt. %. A curing inhibitor can enable the composition to maintain, if desired, a long pot life (e.g., 14 days or longer), and then, when curing is desired, can be removed (e.g., by evaporation) from the composition of the present invention, such as by curing or drying to touch of the resulting invention composition in a comparable amount of time as curing and drying to touch time.

Curing inhibitors may include alkanols, water, carboxylic esters (e.g., ethyl acetate or n-butyl acetate), or ketones, more preferably alkanols, water, or ketones (e.g., acetone or methyl ethyl ketone (MEK)), and still more preferably alkanols, or water and even more preferably alkanols.

Preferably, water is present at a concentration of from 0.5 wt. % to 40 wt. %, based on the total weight of solids in the multicomponent composition, or more preferably, at most 20 wt. %, and, still more preferably, at most 10 wt. %. In some embodiments the curing inhibitor comprises a combination of the ketone or carboxylic ester or water and the alkanol.

The multicomponent compositions of the present invention independently may further comprise one or more additional ingredients. Examples of the additional ingredients are an organic solvent, in the amount of 0.1 weight percent (wt. %) to ≤90 wt. %, based on the total weight of solids in the composition; a dehydrating agent, such as, for example, carboxylic anhydrides, carboxylic acid halides (e.g., acetyl chloride), and sulfonic acid halides (e.g., toluenesulfonyl chloride) in the amount of 0.01 wt. % to ≤10 wt. %, based on the total weight of solids in the composition; as well as any of a surfactant, a dispersing agent, a wetting agent, an adhesion promoter, an ultraviolet (UV) light absorber, a light stabilizer, one or more colorants or dyes, and an antioxidant.

Examples of suitable additional solvents are non-polar or polar organic solvents such as, for example, an alkane (e.g., a ($C_6$-$C_{12}$)alkane), ether (e.g., a ($C_2$-$C_{12}$) ether or a ($C_2$-$C_{12}$) dialkyl ether), carboxylic ester (e.g., a ($C_2$-$C_{12}$)carboxylic ester), ketone (e.g., a ($C_3$-$C_{12}$) ketone), secondary or tertiary carboxamide (e.g., a secondary or tertiary ($C_3$-$C_{12}$)carboxamide), sulfoxide (e.g., a ($C_2$-$C_{12}$)sulfoxide), or a mixture of two or more thereof.

The multicomponent compositions of the present invention may lack organic solvent.

The total polyaldehyde content of the second component of the present invention may range from 10 to 90 wt. %, or, preferably, from 20 to 60 wt. %, based on the total weight of the second component.

The total solids content of the first component of the present invention may range from 10 to 90 wt. %, or, preferably, from 20 to 80 wt. %.

Preferably in the present invention, the curing temperature of the ambient temperature curable composition is 80° C. or lower, more preferably 60° C. or lower, still more preferably 40° C. or lower, and even more preferably 30° C. or lower. Ambient temperature for curing may be at least 0° C., or at least 10° C., or, preferably, at least 20° C., such as, preferably, from 20° C. to 29° C.

The ambient temperature curable composition may be cured for a time period of 7 days or shorter.

Preferably, the curing step of the invention process does not generate a reaction byproduct that is a volatile organic compound (VOC). Curing preferably is initiated by heat, a catalyst, or a combination thereof. Preferably, heat is applied radiantly although other means such as by convection or combinations of means can be used.

Preferably, the catalyst is a protic acid curing catalyst. A suitable amount of a catalyst is from 0.01 wt. % to 10 wt. % of the multicomponent composition, based on the total weight of solids in the composition, more preferably from 0.1 wt. % to 5 wt. % thereof, or, preferably from 0.5 wt. % to 3 wt. % thereof. Such amounts may be referred to herein as "effective amounts" of the catalyst.

Any compound, substance or material suitable for increasing a rate of reaction of a carbamate group (—O—C(=O)—NH$_2$) with an aldehyde group (—C(=O)H) can be employed as the catalyst. Examples of catalysts are Lewis acids (e.g., boron trifluoride etherate) and protic acids (i.e., Brønsted acids). Preferably the catalyst comprises a protic acid characterizable as having a p$K_a$ of 5 or lower, wherein p$K_a$ is the negative base-10 logarithm of acid dissociation constant, $K_a$, of the protic acid. Protic acids can be an inorganic protic acid or organic protic acid.

Preferred inorganic protic acids are phosphoric acid or sulfuric acid.

Preferred organic protic acids are carboxylic acid, phosphonic acid, or sulfonic acid.

Preferred carboxylic acids are acetic acid, trifluoroacetic acid, propionic acid, or a dicarboxylic acid.

A preferred phosphonic acid is methylphosphonic acid. A preferred sulfonic acid is methanesulfonic acid, benzenesulfonic acid, a camphorsulfonic acid; para-toluenesulfonic acid, dinonylnaphthalene disulfonic acid or dodecylbenzenesulfonic acid.

Examples of suitable Lewis acid curing catalysts are $AlCl_3$; benzyltriethylammonium chloride (TEBAC); $Cu(OSCF_3)_2$; $(CH_3)_2BrS^+Br^-$; $FeCl_3$ (e.g., $FeCl_3.6H_2$); $HBF_4$; $BF_3.O(CH_2CH_3)_2$; $TiCl_4$; $SnCl_4$; $CrCl_2$; $NiCl_2$; and $Pd(OC(O)CH_3)_2$.

Remarkably, the crosslinked polyurethane can be prepared even when the polyaldehyde has only two aldehyde groups and the polycarbamate has only two or more carbamate groups. This is because at least one aldehyde group of the polyaldehyde is capable of reacting with two carbamate groups, one from each of two different adjacent polycarbamates, thereby crosslinking the adjacent polycarbamates via the polyaldehyde so as to form one of a plurality of geminal bis(urethane) groups. Such a double reaction produces a molecule of water as a byproduct.

The degree of crosslinking of crosslinked polyurethanes of the present invention may be evidenced by their spectral property (e.g., obtained from proton-nuclear magnetic resonance ($^1$H-NMR) spectroscopy, $^{13}$C-NMR spectroscopy, or FT-IR spectroscopy) or, preferably, by one or more improved performance properties compared to equivalent melamine-formaldehyde cured resins. Preferably at least one of the improved performance properties is cross-hatch adhesion, water resistance, deterioration resistance to methyl ethyl ketone rubs, or high pendulum hardness.

Methods of using the compositions of the present invention may comprise mixing the components of the multicomponent composition, applying the multicomponent composition to at least a portion of the surface of the substrate and curing at a curing temperature of 80° C. or less, or, for example, 30° C. or less, so as to prepare a coated substrate comprising a crosslinked polyurethane.

Preferably, the invention coating exhibits a pendulum hardness in seconds of 30 or greater, more preferably, 50 or greater, still more preferably, 80 or greater, and even more preferably, 100 or greater.

Preferably, the coatings of the present invention exhibits resistance to organic solvent, i.e., methyl ethyl ketone (MEK) back-and-forth double rubbing (i.e., one rub back, one rub forth equals one double rub) of 30 or greater, more preferably, 50 or greater, still more preferably, 70 or greater, even more 100 or greater, and yet more preferably, greater than 200 (>200).

Preferably, the invention coating exhibits water resistance of from 2 to 6, more preferably from 3 to 6, still more preferably from 4 to 6, even more preferably from 5 to 6, and yet more preferably 6. These values are described later.

Preferably, the invention coating exhibits a cross-hatch adhesion value of from 1B to 5B, more preferably from 2B to 5B, still more preferably from 3B to 5B, even more preferably from 4B to 5B, and yet more preferably 5B.

In determining any one or more of the aforementioned pendulum hardness, number of MEK double rubs (back-and-forth), and cross-hatch adhesion values, the coating is formed on a steel substrate as described herein. In determining water resistance values, the coating is formed on a steel or poplar wood substrate as described herein. Preferably the invention coating so formed has a thickness, as measured as described later, of from 10 micrometers (μm) to 70 μm, more preferably 50 μm or less, still more preferably less than 40 μm, and even more preferably less than 30 μm. In some embodiments the invention coating so formed has a thickness of 14 μm or greater, and still more preferably 20 μm or greater.

The multicomponent compositions of the present invention can be applied to the surface of the substrate(s) by any suitable applying means such as, for example, brushing, calendaring, rolling, spraying, mopping, troweling, or dipping. The substrate being coated, adhered to, or sealed can be of any shape including, for example, a flat or rolled sheet (e.g., cylinder), sphere, beads, finely divided particles, and the like. The surface of the substrate being coated, adhered to, or sealed can be irregular or regular, continuous or discontinuous, porous or non-porous, jointed or not jointed.

The suitable substrate for being adhered to, coated, or sealed independently can comprise any material. Examples of suitable substrate materials are wood, metal, ceramic, plastic, and glass.

EXAMPLES

The following examples illustrate the present invention. Materials: If not identified in Tables below, the materials used in the Examples of the present invention are, as follows: Polycarbamate A: Carbamate polymer of 1,3-Benzenedicarboxylic acid, 2-ethyl-2-hydroxymethyl-1,3-propanediol, dodecanoic acid and (9Z)-octadec-9-enoic acid.

CHDA: Mixture of 1,3 and 1,4 cyclohexane dicarboxaldehydes.

Alkyd Polycarbamate: Product of modified alkyd polyol.

Two Stage Alkyd Polyol Synthesis:

First Stage: Alcoholysis. To a 5 L three-neck round bottom flask was added sunflower oil (1388.9 g). A glass stir rod and paddle were placed in the middle joint of the flask. The flask was attached to a lattice with overhead stirring, and an oil bath at room temperature was raised to submerge the flask. The setpoint on the bath was 220° C. and heating and stirring were started. To the stirred oil, pentaerythritol (713.6 g) and dibutyltin catalyst (1200 ppm on total reactor charge were added. Once all reactants were added, a packed condenser with a set point of 95° C. was attached to one of the side joints and topped with a hose adaptor that was connected to a bubbler. To the other side neck, a second hose-adaptor was attached and connected to a nitrogen inlet. A slow nitrogen sweep was placed on the system and observed in the bubbler. The reaction mixture was allowed to heat and mix overnight to ensure high conversion. This stage was completed when a "monoglyceride" of the sunflower oil was achieved, meaning that the reactor contents homogeneously dispersed in methanol at one part resin to three parts methanol.

Second Stage. The 5 L three-neck flask containing the alcoholysis mixture from the first stage was equipped with a glass stir shaft and paddle. The flask was attached to a lattice with overhead stirring. An oil bath at room temperature was raised to submerge the flask. The set point on the bath was 220° C. and heating and stirring were started. To the flask, isophthalic acid (359.0 g), phthalic anhydride (538.5 g), and xylenes (2 wt. % on total charge) were added. Then, a Dean-Stark trap was connected to one of the side joints and topped with a Friedrichs condenser connected to an outlet bubbler. A nitrogen sweep was placed on the system. The system was allowed to heat (220° C.) and the water formed was distilled out as an azeotrope with xylenes. This second stage of the reaction was monitored by removing samples from the reactor and titrating the acid value (AV). The reaction was allowed to progress until the desired AV (8.0 mg KOH/g) was reached. The alkyd polyol had a measured OH number of 180 mg KOH/g (on solids). Then the reaction contents were poured into a glass jar and allowed to cool to room temperature under a pad of nitrogen.

Alkyd Polycarbamate Synthesis:

A reaction was carried out in a 2000 ml round bottom reactor system equipped with a mechanical stirrer, reflux condenser, nitrogen gas purge system and temperature control. A heating mantle was used for temperature control. The reactor was charged with the alkyd polyol (2000 g) from above, diluted to a final solids level of 60-70% in xylene, to achieve a process viscosity which allowed efficient stirring at 140° C. The catalyst, Fascat™ 4201 dibutyl tin oxide (DBTO, Arkema, Inc., Philadelphia, Pa.), was added to the alkyd polyol in the reactor at 0.6 wt. % on solids. The amount urea (99.5 wt. % pure, Sigma-Aldrich, St. Louis, Mo.) used was calculated based on the hydroxyl value for the alkyd polyol to target 62% conversion of the hydroxyl groups. For the 2000 g batch of alkyd polyol, 238.7 g total of urea was first dissolved in distilled water to make a 50 wt. % aqueous solution. The alkyd-solvent-catalyst mixture in the reactor was slowly heated to 140° C. and nitrogen purged for at least 30 min. Urea solution was loaded into 60 ml glass syringes and was carefully fed into the reactor at a constant controlled rate through a syringe pump. The urea solution was steadily fed into the reactor over 6-10 hrs. Azeotropic vapor was formed and cooled in the condenser, which was then collected in the Dean-Stark trap. 5. The reaction was carefully maintained at 140° C., mixing at 500-600 rpm and continued for 10-12 hr. until completion. Samples were taken periodically for NMR and GPC analysis. The Carbamate Conversion (from hydroxyl to carbamate) was calculated at 66%.

Dibutyltin oxide is purchased from the Aldrich Chemical Company.

Luperox™ tertiary-amyl 2-ethylhexyl peroxycarbonate (TAEC), a radical initiator, is purchased from Arkema. Inc., Philadelphia, Pa., USA.

Steel plates are Act Test Panels, Cold Roll Steel, smooth and clean, having dimensions of 4 inches by 12 inches by 0.02 inch (i.e., 10 centimeters (cm) by 30 cm by 0.05 cm).

Poplar wood boards are Home Depot poplar, having dimensions 3.5 inches by 5 inches (8.9 cm by 13 cm), cut from 3.5 inches by 3 feet (8.9 cm by 91 cm) boards.

Examples 1 and 2: Performance and Stability of the Compositions

TABLE 1

Compositions

| Raw Material | Supplier | High Gloss Clear Wood Finish with Example 1 wt. (grams) | High Gloss Clear Wood Finish with Example 2 wt. (grams) |
|---|---|---|---|
| First Component | | | |
| Polycarbamate A | — | 49.15 | 47.93 |
| n-butyl acetate | Fischer Scientific (Fair Lawn, NJ) | 18.27 | 17.81 |
| BYK ™ 399 Surface-active polymer, silicone-free | BYK Chemie (Wesel, DE) | 0.05 | 0.05 |
| Second Component | | | |
| CHDA | — | 5.67 | 8.02 |
| Ethanol | Fischer Scientific (Fair Lawn, NJ) | 25.58 | 24.94 |
| Nacure ™ 1040 (40% p-TSA in iso-propanol) | King Industries (Fair Lawn, NJ) | 1.28 | 1.25 |
| A + B | | 100 | 100 |

The two component composition formulations identified in Table 1, above, were coated on an aluminum 7.6 cm by 15.2 cm metal substrate using a 152.4 micron (6 mil) gap bar and were cured by for 7 days in a controlled temperature at 23° C. (72 F) and relative humidity (50%) laboratory. To give coatings that were about 35-50 microns thick. The coatings were tested and the results are given in Table 2, below.

Test Methods:
Heat Aging:
The second component was heat aged for 4 weeks @ 60° C. and was examined by visual inspection for gelation or phase separation.

Dry Time:
Determined by ASTM D5895 using a Gardco Electronic Ultracycle Circular Drytime Recorder 5000 series (Paul Gardner Company, Pompano Beach, Fla.).

Thickness of the Coating:
ASTM D7091-05 (Standard Practice for Nondestructive Measurement of Dry Film Thickness of Nonmagnetic Coatings Applied to Ferrous Metals and Nonmagnetic, Nonconductive Coatings Applied to Non-Ferrous Metals (2005)).

Gloss:
Measurements are made with a BYK Labotron Gloss Unit following ASTM D523-08 (Standard Test Method for Specular Gloss (2008)) and at the indicated angle of gloss measuring unit to substrate. An acceptable gloss result is retention of the initial gloss.

Pendulum Hardness:
According to the Koenig pendulum hardness test by following ANSI ISO1522:2006 (Pendulum damping test, (2006)). The hardness is measured after the indicated cure time at room temp and 50% relative humidity in seconds it takes to dampen pendulum swing. An acceptable result is from 50- to 150 seconds.

MEK Double Rub Resistance:
In Examples 3 to 3A, a MEK Rub test Machine (DJH Designs, Oakville, ON, CA) was used to evaluate coating resistance to methyl ethyl ketone (MEK) similar to ASTM D 4752-98 (1998). Coatings were cured at room temperature (24° C.) and 50% relative humidity for the indicated time. The tester moved a cotton pad, attached to a weighted block that applies a force of 0.155 Kg/cm$^2$ (~2.2 lb/in$^2$), in a back and forth motion across the coated panel. Each back and forth is referred to as one double rub. Rubbing was continued until the indicated failure occurred, and that number of double rubs was recorded. Unless otherwise indicated, rubbing was continued until the coating was cut through and the substrate became visible in any area, and that number of double rubs was recorded. An acceptable result is at least 100-200 double rubs.

Tape Crosscut Adhesion:
Crosscut adhesion was measured and rated according to a modified version of ASTM D-3359-09 (2009) where a 10 cm piece of Permacel™ 99 pressure adhesive (3M, Minneapolis, Minn.) tape was laid over the indicated coating and a 3 mm blade was used to make a crosscut in testing how well the coating adheres to the substrate when the tape is pulled off. ASTM ratings range from 0 A to 5 A where a rating of 5 A is desired. According to the method, the scale reads as: 5 A (no peeling or removal); (4 A) Trace peeling or removal along incisions or at their intersection; (3 A) Jagged removal along incisions up to 1.6 mm ($\frac{1}{16}$ in.) on either side; (2 A) Jagged removal along most of incisions up to 3.2 mm ($\frac{1}{8}$ in.) on either side; (1 A) Removal from most of the area of the X under the tape; and (0 A) Removal beyond the area under the tape. An acceptable result is 4 A or higher.

Time to Sand:
The sandability was determined by the time reached where using hand sanding, 320 grit sandpaper did not cake with primer and material was easily shaken or knocked off the sand paper. An acceptable result would be ability to sand the primer within an hour.

Thermal Yellowing:
Determined by applying a 380 micron thick wet film to a white ceramic tile. After one hour ambient cure, room temp and 50% relative humidity, the coated ceramic tiles were placed into a 60° C. oven for 24 hours. Cielab (L* a* b*) color measurements were taken before and after thermal cycle. The delta E of the coatings were calculated from the initial and final L* a* b* values. Delta E is equal to the square root of the sum of the square of $(L^*_{initial} - L^*_{final})^2 + (a^*_{initial} - a^*_{final})^2 + (b^*_{initial} - b^*_{final})^2$.

The second component of Examples 1 and 2, formulated with catalyst was shelf stable after a 4 week heat age test was completed. No visible phase separation was observed. Other results are shown in Table 2, below.

TABLE 2

Performance Results

| Example 1 | Dry time (min) | Gloss 20° | Gloss 60° | Gloss 85° | Pendulum Hardness (sec) 4 hr | Pendulum Hardness (sec) 1 day | Pendulum Hardness (sec) 7 day | MEK (dbl rub) 24 hr | MEK (dbl rub) 7 day | Thermal Yellowing initial *b | Thermal Yellowing Delta *b | Thermal Yellowing Delta E |
|---|---|---|---|---|---|---|---|---|---|---|---|---|
| Initial | 23.33 | 84 | 96.3 | 96.2 | 28 | 170 | 188 | 163 | >200 | 6.2 | 5.79 | 5.99 |
| 1 wk | 26.67 | 85.7 | 97.2 | 98.3 | 73 | 103 | 105 | 152 | >200 | 5.22 | 7.32 | 7.55 |
| 2 wk | 22 | 88.6 | 97.4 | 98.6 | 78 | 138 | 178 | 167 | >200 | 6.4 | 7.39 | 7.63 |
| 3 wk | 25.33 | 85.1 | 96.4 | 99 | 59* | 149 | 160 | 180 | >200 | 5.69 | 7.38 | 7.63 |
| 4 wk | 26.67 | 85.8 | 97.4 | 98.4 | 60 | 138 | 170 | 180 | >200 | 5.98 | 7.39 | 7.62 |
| 2 | (min) | 20° | 60° | 85° | 4 hr | 1 day | 7 day | 24 hr | 7 day | initial *b | delta *b | delta E |
| Initial | 22.33 | 88.2 | 97.5 | 97.9 | 49 | 185 | 199 | 143 | >200 | 5.98 | 6.36 | 6.89 |
| 1 wk | 23.33 | 87.2 | 97.1 | 98.5 | 35 | 106 | 108 | 141 | >200 | 5.15 | 9.36 | 9.74 |
| 2 wk | 25.33 | 85.9 | 96.6 | 98.9 | 49 | 117 | 171 | 165 | >200 | 6.56 | 8.35 | 8.7 |
| 3 wk | 20 | 90.1 | 97.6 | 99.1 | 44* | 132 | 166 | 163 | >200 | 5.98 | 8.03 | 8.42 |
| 4 wk | 25.33 | 86.8 | 97.1 | 98.8 | 50 | 124 | 166 | 167 | >200 | 6.24 | 8.37 | 8.65 |

Even after the coating materials were left on the shelf for 4 weeks with the catalyst contained in the second component, the coating performance properties in Table 2, above, including drytime, hardness and MEK resistance tested within critical test requirements. Gloss was generally retained.

Examples 3 and Comparative 3A: 2K Formulation of a Primer Surfacer

TABLE 3A

Example 3, 2 Component Primer Surfacer Formulation

| | Amount (g) |
|---|---|
| Carbamate Component | |
| Alkyd Carbamate (54.9 wt. % in xylene) (Equiv. Wt. of polyol to carbamylation = 315 on solids as determined by hydroxyl titration) | 75.2 |
| Toluene (solvent) | 42.9 |
| MEK (solvent) | 15.8 |
| Disperbyk ™,1 BYK-110 (dispersant) | 2.5 |
| Tiona ™,2 595 Titanium Dioxide (pigment) | 15.6 |
| Nicron ™,3 Talc 665 | 15.6 |
| Burgess Optiwhite ™,4 Calcined aluminum silicate | 10.3 |
| Barium Sulfate (pigment) | 17.9 |
| Diacetone alcohol (solvent) | 4.2 |
| Total Part A | 200 |
| Acetal Component | |
| CHDA (88 wt. active solids %) (Equiv Wt = 70 on solids) | 9.4 |
| Ethanol | 29.2 |
| Paratoluene sulfonic acid (40 wt. % in isopropanol) | 1.5 |
| Total Part B | 40 |

[1]Byk Chemie, (Wesel, DE);
[2]Cristal, Hunt Valley, MD;
[3]Imerys, Overland Park, KA);
[4]Burgess Pigment, Sanderson, GA.

In each of Examples 3 and 3A (comparative), Primer Part A was prepared by overhead mixing using a Dyspermat™ mixer (VMA-Getzman, Reichshof, Del.). A Hegman gauge was to determine how finely ground the pigments are dispersed in the paint. The mixed paint had a value of 5.5 Hegman units. A solution of Part B was heat aged at 60 degrees ° C. for 4 weeks prior to use. Prior to spraying primer, 40 g of the heat aged Part B was added to Component A with stirring.

TABLE 3B

Comparative Example 3A 3 Component Primer Surfacer Formulation

| | Amount (g) |
|---|---|
| Part A - Carbamate Component | |
| Alkyd Carbamate (54.9 wt. % in xylene) (Equiv. Wt. of polyol to carbamylation = 315 on solids as determined by hydroxyl titration) | 68.0 |
| Toluene (solvent) | 38.8 |
| MEK (solvent) | 14.3 |
| Disperbyk ™,1 BYK-110 (dispersant) | 2.3 |
| Tiona ™,2 595 Titanium Dioxide (pigment) | 14.1 |
| Nicron ™,3 Talc 665 | 14.1 |
| Burgess Optiwhite ™,4 Calcined Aluminum Silicate | 9.3 |
| Barium Sulfate (pigment) | 16.2 |
| Diacetone alcohol (solvent) | 3.8 |
| Ethanol | 19.1 |
| Total Part A | 200.0 |
| Part B - Polyaldehyde Component | |
| CHDA (88 wt. % active solids) (EW = 70 on solids) | 9.4 |
| Total Part B | 9.4 |
| Part C - Catalyst Component | |
| Paratoluene sulfonic acid (40 wt. % in isopropanol) | 2 |
| Total Part C | 2 |

[1]Byk Chemie, (Wesel, DE);
[2]Cristal, Hunt Valley, MD;
[3]Imerys, Overland Park, KA);
[4]Burgess Pigment, Sanderson, GA.

Part A was prepared by overhead mixing using a Dyspermat™ mixer (VMA-Getzman, Reichshof, Del.). No heat aging was conducted on Part A. The resulting Hegman value of the primer was 5.5 or greater. Prior to spraying the primer, Part B was added to Component A with stirring followed Part C.

Coatings Application:

The Example 3 and 3A primer was sprayed in two coats, with a 10 minute flash time in between each coat. The time to sand was measured after the second 10 minute flash of the second applied coating. The coating was applied to cold roll steel panels sanded with 80 grit sand paper.

For panels with base and clear coats, the base and clear coat were applied after the primed panels were sanded. A commercial black base coat was then applied after the panels were sanded according to manufacturer's recommendations. A commercial clear coat (2 coats sprayed) was applied over the base coat according to the manufacturer's recommendations. The panels were cured overnight at room temperature prior to evaluations.

TABLE 4

Time to Sand the Primer

|  | Comparative Example 3A (3K) | Example 3 (2K) |
|---|---|---|
| Time to Sand Primer (min) | 40 | 40 |

As shown in Table 4, above, the time to sand the primer was comparable for both the inventive 2K method and the comparative 3K method, with both primers sanding in 40 minutes (with two, ten-minute flashes). This is surprising because one cannot expect to store and then use the inventive compositions as a 2 component material.

TABLE 5

Primer Performance

| Panel type | Example 3A (Comparative) 3K Addition | | | | Example 3 2K Addition | | | |
|---|---|---|---|---|---|---|---|---|
|  | Primer | Primer | Primer/ Base/ Clear | Primer/ Base/ Clear | Primer | Primer | Primer/ Base/ Clear | Primer/ Base/ Clear |
| Film Thickness (microns) | 72 | 72 | 152 | 163 | 66 | 76 | 171 | 163 |
| MEK double rubs |  |  |  |  |  |  |  |  |
| 24 h Initial Damage/Mar | <5 | <5 |  |  | <5 | <5 |  |  |
| 24 h 25% Film Loss or 200 rubs | >200 | >200 |  |  | 200 | >200 |  |  |
| 7 d Initial Damage/Mar | 10 | 10 |  |  | 5 | 5 |  |  |
| 7 d 25% Film Loss or 200 rubs | >200 | >200 |  |  | >200 | >200 |  |  |
| Cross Hatch Adhesion |  |  |  |  |  |  |  |  |
| 24 hour | 5B | 4B | 5B | 5B | 5B | 4B | 5B | 5B |
| 7 Day | 4B | 4B | 5B | 5B | 4B | 4B | 4B | 3B |

As shown in Table 5, above, the primer prepared in Example 3 (2K addition) had comparable MEK double rubs and cross adhesion results to primers prepared through the 3K addition route, both after 24 h and 7 days. When base and clear coats were applied to the sanded primer, the crosshatch adhesion values of resulting coated panel were comparable between the inventive and comparative examples. This is surprising as the inventive example eliminated the additional separate catalyst component.

We claim:

1. A substantially isocyanate-free two-component composition having a pH of 7.0 or less comprising:
    as a first component,
       one or more polycarbamate having two or more carbamate groups, and
       one or more polymeric matting agent, filler, extender, or pigment in the amount of from 1 to 80 wt. %, based on the total solids of the first component, and,
    as a second component,
       from 5 to 90 wt. %, based on the total weight of the second component, of one or more alkanol having one OH group,
       one or more polyaldehyde that has two or more aldehyde groups, or
       one or more acetal or hemiacetal of the polyaldehyde, and
       from 0.01 to 10 wt. % of one or more catalyst having a $pK_a$ of less than 5.0, based on the total weight of solids in the composition,
    said composition having less than 5 mol % of isocyanate (—N═C═O) groups based on total moles of carbamate groups plus isocyanate groups in the composition;
    wherein the first and second components when combined form a composition that reacts to cure at a temperature of from 0° C. to less than 80° C. to form a crosslinked polyurethane.

2. The two-component composition as claimed in claim 1, wherein the alkanol having one OH group is a primary alcohol.

3. The two-component composition as claimed in claim 1, wherein the catalyst is an organic or inorganic protic acid or salt thereof.

4. The two-component composition as claimed in claim 1, wherein the catalyst is a sulfonic acid.

5. The two-component composition as claimed in claim 1, wherein in the first component of the composition, the polycarbamate is the condensation product of one or more polyols with an unsubstituted carbamic acid alkyl ester or urea.

6. The two-component composition as claimed in claim 5, wherein the one or more polyols is an acrylic polyol, or an alkyd polyol.

7. The two-component composition as claimed in claim 1, wherein in the second component of the composition, the polyaldehyde from which the acetal or hemiacetal is formed preferably has a solubility in water of less than 0.15 gram of polyaldehyde per milliliter of water at 25° C.

8. The two-component composition as claimed in claim 1, wherein the polyaldehyde in the second component is chosen from (cis,trans)-1,4-cyclohexane dicarboxyaldehydes, (cis,trans)-1,3-cyclohexanedicarboxyaldehydes and mixtures thereof.

9. The two-component composition as claimed in claim 1, comprising one or more pigments, fillers or extenders chosen from any metal oxides, metal carbonates, silica, and alkali metal silicates.

10. The two-component composition as claimed in claim 1, wherein the blend ratio of the first component to the second component from is from 2:1 to 5:1 by weight.

11. The two-component composition as claimed in claim 1, wherein the one or more polyaldehyde is a dialdehyde.

12. The two-component composition as claimed in claim 1, wherein the one or more polyaldehyde is a cyclic dialdehyde.

13. The two-component composition as claimed in claim 1, wherein the one or more polyaldehyde is a cycloaliphatic dialdehyde.

* * * * *